Sept. 7, 1965  M. BITZER ETAL  3,204,279
WINDSHIELD WIPING SYSTEM
Filed Feb. 12, 1964  2 Sheets-Sheet 1
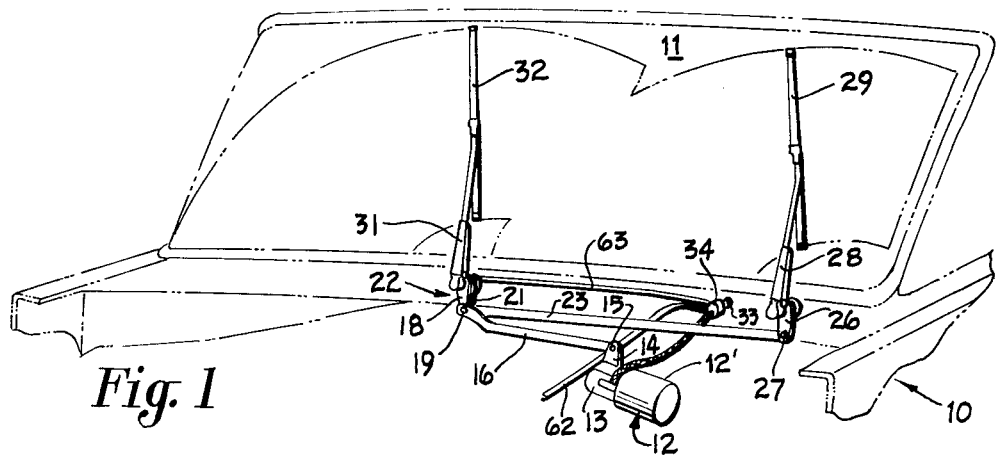
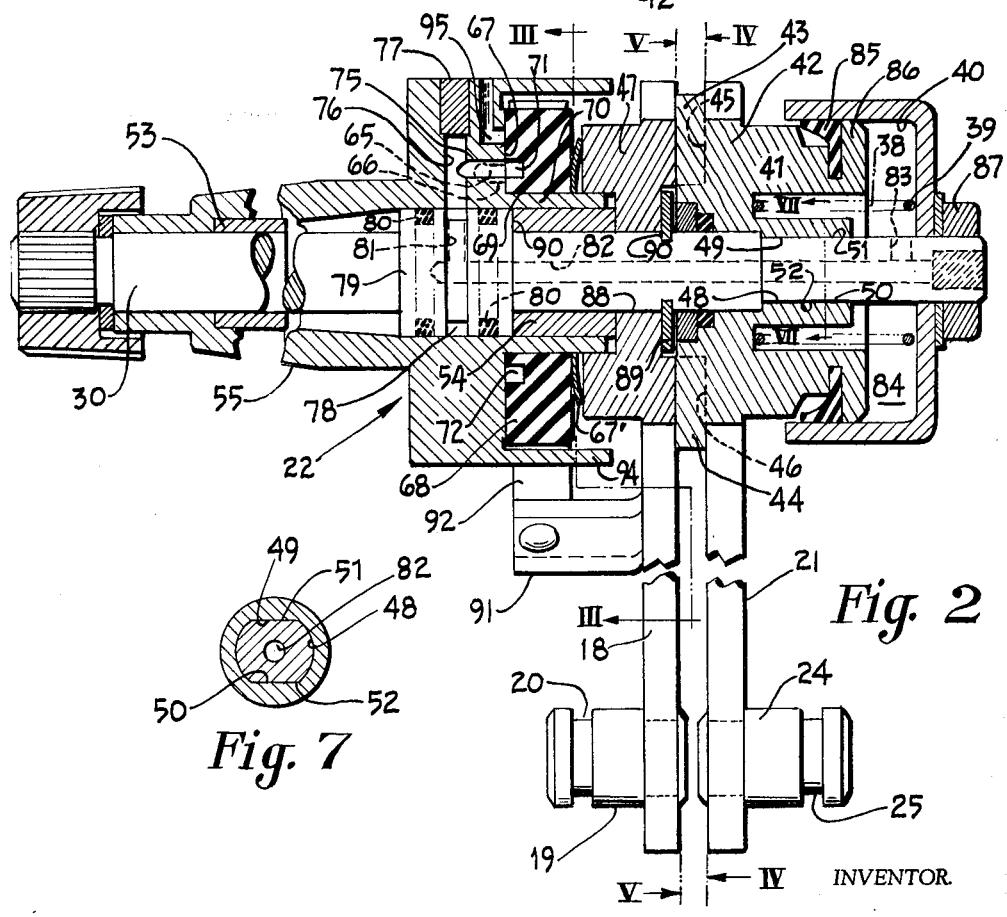
INVENTOR.
MARTIN BITZER and
BRONISLAUS S. GRACZYK.
BY
E. Herbert Liss
ATTORNEY.

Sept. 7, 1965  M. BITZER ETAL  3,204,279
WINDSHIELD WIPING SYSTEM
Filed Feb. 12, 1964  2 Sheets-Sheet 2
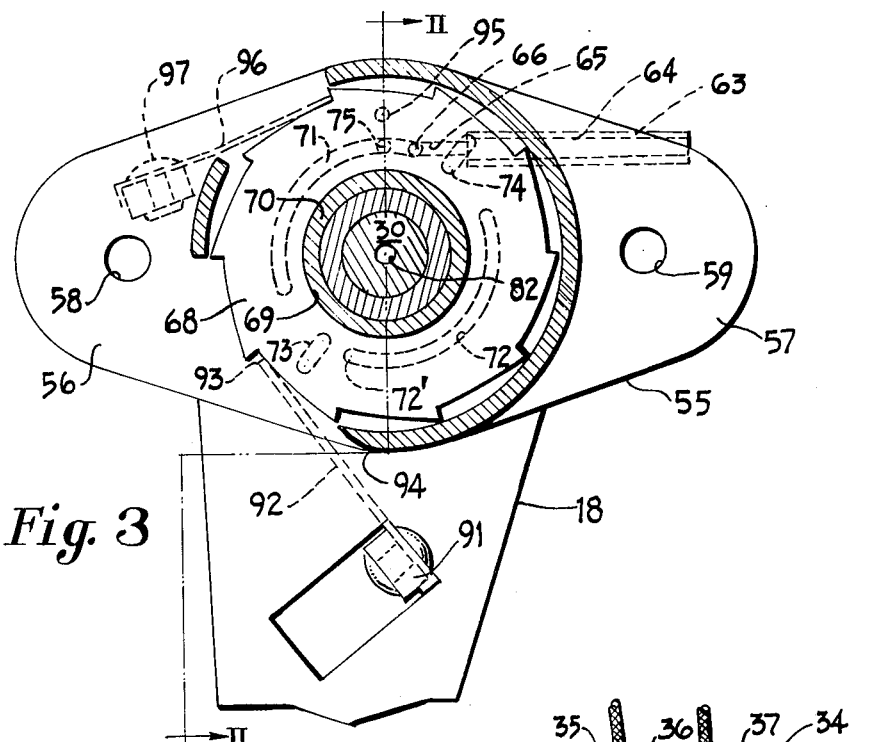
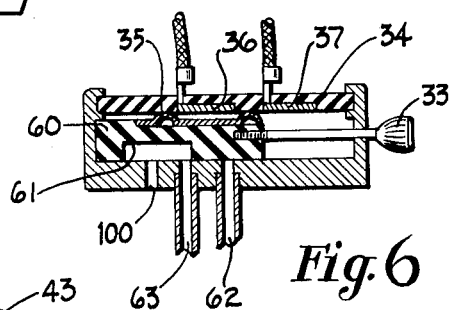
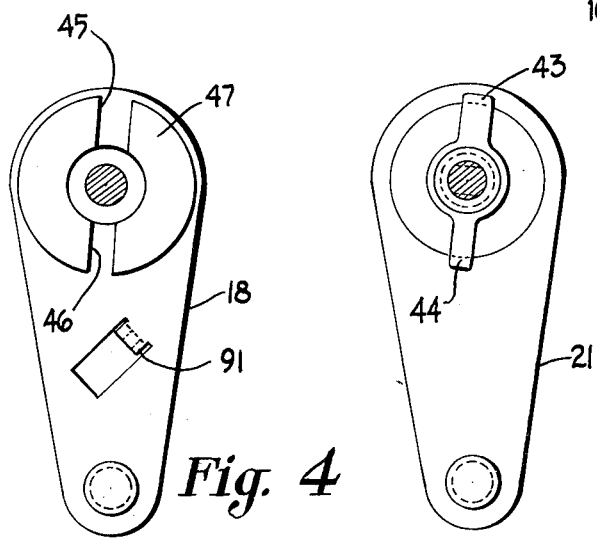
INVENTOR.
MARTIN BITZER and
BRONISLAUS S. GRACZYK
BY
E. Herbert Liss
ATTORNEY.

3,204,279
WINDSHIELD WIPING SYSTEM
Martin Bitzer, 150 Highland Parkway, Kenmore 23, N.Y., and Bronislaus S. Graczyk, 45 Lamarck Drive, Snyder, N.Y.
Filed Feb. 12, 1964, Ser. No. 344,342
8 Claims. (Cl. 15—250.12)

The present invention relates to improved windshield wiping apparatus for motor vehicles and, more particularly, to improved windshield wiping apparatus for producing intermittent dwell operation wherein there is provided a period of rest between cycles of wiper operation.

In presently used windshield wiper systems the wiper blades move continuously at a selected frequency across the path of sight. In some installations the frequency may be varied or a multi-speed wiper may be employed. In these installations varying the frequency varies the velocity at which the wiper moves across the wiping path. Intermittent dwell action wipers provide improved wiping efficiency over variable velocity and fixed velocity continuous operating windshield wiper apparatus in light or moderate rain or where wet road conditions result in splash-back on the windshield of trailing vehicles.

The intermittent dwell type wipers permit variation in frequency of the wipe while maintaining a desired velocity of the blade across the path of vision. The dwell period permits sufficient wetting of the windshield to provide ample lubrication for the blade, thereby reducing wear and preventing chattering. During the dwell period the car-created wind stream is utilized to evaporate and clear the transparent film of water ordinarily continuously remaining after uninterrupted cycling of blade operation. Furthermore, the driver fatigue induced by the monotony of continuous operation is eliminated.

Various types of intermittent dwell wiper systems have been developed and are known. In these known systems, interruption of wiper operation is accomplished by clutching in the wiper motor gear box or by interrupting the energy source for the motor. Examples of such systems are shown in Patent No. 3,118,164, issued January 21, 1964, by R. A. Deibel, W. C. Riester and R. D. Page, and Patent No. 3,117,335, issued January 14, 1964, by J. R. Oishei, R. A. Deibel and M. Bitzer. In certain installations it is inconvenient or undesirable to alter the gear box or the electrical circuitry of an electric motor. This is particularly true where an intermittent dwell action is offered as optional equipment and it is desired to stock a standard type motor for both the intermittent action system and the continuous action system. The present invention contemplates interrupting wiper operation and initiating the dwell cycle through a pivot assembly in the linkage system, either at the arm pivot or elsewhere. An important advantage of this system is its versatility of adaption to any type of motor including but not limited to electric, pneumatic or hydraulic, rotary or oscillatory, with or without a gear reducer. Although a vacuum operated clutch is shown, it will be apparent that, in accordance with the broadest aspects of the invention, this clutch may be actuated by other means as, for example, a solenoid or a cam.

The principal object of the present invention is to provide improved windshield wiper apparatus for producing intermittent dwell action wherein a controllably disengageable connecting means is employed in the transmission system between the power unit and the wiper arm.

Another object of the invention is to provide an improved intermittent dwell action wiper apparatus for motor vehicles which utilizes a linkage actuated timer for controlling disengagement of a clutch element between transmission elements in a wiper system.

Another object of the invention is to provide an improved intermittent dwell wiper apparatus for motor vehicles utilizing a controllably disengageable connection in the linkage assembly for providing selectively intermittent or continuous wiper operation.

A further object of the invention is to provide improved intermittent dwell windshield wiping apparatus for motor vehicles which utilizes a controllably disengageable connection in the linkage system for producing selectively intermittent dwell operation or continuous operation and which is inherently responsive to vehicle acceleration for automatically effecting continuous wiper operation.

Other objects and advantages of the invention will be apparent from the following detailed description taken in connection with the accompanying drawings in which:

FIG. 1 is a fragmentary perspective view of an automotive vehicle mounting the linkage of the present invention which selectively provides intermittent operation;

FIG. 2 is an enlarged view partially in cross section taken along line II—II of FIG. 3 and showing the mechanism associated with one of the pivot shafts of the linkage which provides intermittent operation;

FIG. 3 is a view taken substantially along line III—III of FIG. 2 and showing particularly the timing mechanism and valve structure used in obtaining intermittent operation;

FIG. 4 is a view of the crankarm on the pivot shaft assembly which is driven by the wiper motor and taken generally in the direction of the arrows IV—IV of FIG. 2;

FIG. 5 is a view of a crankarm which is driven by the motor driven crankarm of the pivot shaft assembly when it is engaged therewith, this view being taken substantially in the direction of arrows V—V of FIG. 2;

FIG. 6 is a view of the control which is utilized to selectively provide either continuous wiper motor operation or intermittent wiper motor operation with intervening dwell periods between successive cycles of wiper movement; and FIG. 7 is a view taken along VII—VII of FIG. 2.

In FIG. 1 an automotive vehicle 10 is shown having a windshield 11 mounted thereon in the conventional manner. Suitably affixed underneath the cowl of the vehicle, as on the firewall (not shown) is a power unit 12, comprising a motor 12' which, in this instance, is of the electrical type, and a gear reducer 13 having an output crank 14 which is driven in a rotary manner. It will of course be understood that any suitable type of motor as, for example, a pneumatic or hydraulic motor, may be utilized, with or without a gear reducer.

Transmission means, as for example a linkage system, which includes output crank 14 and elongated links 16 and 23, is provided for transmitting motion from the output shaft of power unit 12 to the wiping elements. Pivotally affixed at 15 to crankarm 14 is one end of elongated link 16, the other end of which is pivotally mounted on pin 19 on the outer end of crankarm 18. In this respect, an aperture at the end of link 16 fits over pin 19 which is riveted to the end of torque transmitting element or crankarm 18, and a retaining clip (not shown) fits within groove 20 of pin 19 to retain link 16 in position. In a manner to be described in greater detail hereafter, crankarm 18, in turn, selectively drives crank arm 21 which in combination with crankarm 18 and associated structure forms a part of pivot shaft assembly 22. One end of elongated link 23 is pivotally mounted on pin 24 which is riveted to the end of crankarm 21, this end being retained in position on pin 24 by a suitable clip (not shown) which fits into groove 25. The other end of elongated link 23 is pivotally secured to the outer end of crankarm 26 at 27 in a similar manner. Crankarm 26 is fixedly mounted on a rockshaft (not shown) which is journaled in the cowl of the vehicle and also mounts wiper arm 28 which in turn mounts wiper 29. Pivot shaft 30 (FIG. 2), which is associated with pivot shaft assembly 22, mounts wiper arm 31 which in turn carries wiper 32 to form a wiping assembly. Pivot shaft 30 is mounted in bearings 53 and 54 which are located within housing portion 55 of the pivot shaft assembly 22, said housing in turn having ears 56 and 57 with apertures 58 and 59 (FIG. 3), respectively, which receive fastening members (not shown) utilized to fasten said housing to a suitable portion of the vehicle. It will be appreciated that whenever wiper motor 12' is placed in operation so that it drives the above described linkage, wipers 29 and 32 will be caused to oscillate back and forth across windshield 11 to thereby clear moisture therefrom.

The pivot shaft assembly 22 is constructed so as to provide continuous oscillation of wipers 29 and 32 when motor 12' is placed in operation or to selectively provide intermittent operation of wipers 29 and 32 with intervening dwell periods between successive cycles of wiper movement. Whenever it is desired to provide conventional continuous wiper oscillation, it is merely necessary to manipulte control knob 33 of control 34 mounted on the vehicle dashboard to cause armature 35 to bridge contacts 36 and 37 to thereby provide electric current to wiper motor 12' and cause crankarm 14 thereof to rotate. This in turn will cause oscillation of the elongated link 16, and, in turn, cause oscillation of crankarm 18 which forms a part of pivot shaft assembly 22, the parts of which will retain the relative positions shown in FIG. 2 during said continuous operation. More specifically, when control 34 has been set to provide continuous operation, a spring 38 (FIG. 2), which has one end 39 bearing against the end of cylinder or housing 40 and the other end 41 bearing against clutch element 42 which may be integral with crankarm 21, causes engaging means or keys 43 and 44 on clutch element 42 to be retained in mating engagement with cooperating engaging means or keyways 45 and 46, respectively, (FIG. 4), which are located in the clutch element 47 which may be integral with crankarm 18. It will be appreciated that as crankarm 18 is oscillated to and fro by elongated link 16, crankarm 21 will also be oscillated to and fro in unison therewith because of the mating engagement between keys 43 and 44 with keyways 45 and 46, respectively. It is to be noted at this point that the clutch element or head portion 42 of crankarm 21 has a central aperture 48 therein (FIG. 7) with flats 49 and 50 on opposite sides thereof which are in sliding engagement with milled flats 51 and 52, respectively, of pivot shaft 30. Thus the oscillation of crankarm 18 will cause a corresponding oscillation of crankarm 21 to thereby cause oscillation of pivot shaft 30 and wiper 32 mounted thereon because of the above-noted connection between crankarm 21 and shaft 30. In addition, the oscillation of crankarm 21 will cause oscillation of crankarm 26 to which it is attached through elongated link 23 to thereby cause oscillation of wiper 29. Thus the actuation of control 34 in the above manner will cause wipers 29 and 32 to oscillate continuously across the windshield to clear moisture therefrom.

When it is desired to obtain intermittent oscillation of wipers 29 and 32 with intervening dwell periods between successive cycles of wiper movement, as is desirable when the windshield is subjected to a very light rain or continuous wheel spray, knob 33 of control 34 is moved to a position wherein armature 35 still bridges contacts 36 and 37 and wherein conduit 61 of slide valve 60 effects communication between conduits 62 and 63. Conduit 62 has the end thereof which is remote from control 34 in communiaction with the engine intake manifold and conduit 63 has the end thereof remote from control 34 mounted on nipple 64 extending from pivot shaft assembly housing 55. There is a bore 65 in housing 55 which is in communication with nipple 63. (Also see FIG. 2.) Bore 65 merges with bore 66 which leads to face 67 of housing 55. A plastic ratchet wheel 68, which also serves as a valve, has its central circular aperture 69 rotatably mounted on cylindrical extension 70 of housing 55. The face of ratchet wheel 68 which is in sealing engagement with face 67, under the bias of spring 67' has circular grooves 71 and 72 therein with grooves 73 and 74 between the ends of said grooves as shown in FIG. 3. When ratchet wheel 68 is in the position shown in FIGS. 2 and 3, bore 66 is in communication with groove 71. In addition, a bore 75 in housing 55 extends parallel to bore 66 and is located between face 67 and bore 76 in housing 55, which has its upper end blocked by plug 77 and its lower end open to peripheral circular groove 78 in enlarged portion 79 of pivot shaft 30. O-ring seals 80 are located on portion 79 to prevent leakage between groove 78 and housing 55. In pivot shaft 30, groove 78 is in communication with radial bore 81 which in turn is in communication with longitudinal bore 82 which in turn is in communication with radial bore 83 leading to chamber 84 of cylinder 40. Thus, the causing of groove 61 of slide valve 60 to bridge conduits 62 and 63 causes evacuation of chamber 84 of cylinder 40 through bores 83, 82, and 81, groove 78, bore 76, bore 75, groove 71 in ratchet wheel 68, bore 66, bore 65, nipple 64, conduit 63, valve groove 61, and conduit 62 which leads to the engine intake manifold.

Upon the evacuation of chamber 84 in the above-described manner, head portion 42 of crankarm 21 will be caused to slide to the right (FIG. 2) on shaft 30 against the bias of spring 38 inasmuch as seal 85 causes the end portion 86 of pivot shaft 21 to act as a piston. Movement of cylinder 40 to the right is prevented because of nut 87 which is secured to the end of pivot shaft 30. It will be appreciated that as head 42 moves to the right, keys 43 and 44 thereon will move out of engagement with keyways 45 and 46 of pivot shaft 18. Thus the continued oscillation of pivot shaft 18 in response to the operation of motor 12' will be ineffective for causing oscillation of pivot shaft 30 inasmuch as there is no longer a driving connection therebetween, said driving connection having previously been effected through the above-mentioned keys and keyways in combination with the flats on the pivot shaft and on head 42 of crankarm 21. In other words, head portion 47 of crankarm 18 will idle back and forth on the portion of pivot shaft 30 which is contiguous to central aperture 88 of said head portion 47. Head portion 47 of crankarm 21 will not, under any circumstances, move to the right with head portion 42 of crankarm 21 because a washer 89 is mounted within groove 90 of pivot shaft 30 to thereby limit movement of crankarm 18 to the right in FIG. 2. Movement to the left of head portion 47 in FIG. 2 is prevented because of the existence of bearing 54 between head portion 47 and shoulder 90 on pivot shaft 30.

During the time that crankarm 18 oscillates back and forth idly on pivot shaft 30, the timing between successive cycles of wipers movement is effected. More specifically, as can been seen FIGS. 2 and 3, a tang 91 is struck up from crankarm 18 and riveted thereto is a leaf spring 92, the end of which acts as a pawl to selectively drive ratchet wheel 68. In other words, the end 93 of spring 92 will engage each of the teeth or ratchet wheel 68 in succession and intermittently drive the ratchet wheel is a clockwise direction in FIG. 3 during clockwise rotation of crankarm 18. When crankarm 18 moves in a counterclockwise direction in FIG. 3, the end 93 of spring 92 will ride over housing portion 94 and will only again engage a successive ratchet tooth after it has again commenced its clockwise rotation. As long as groove 71 (FIG. 3) bridges bores 66 and 75, chamber 84 will be evacuated and there will be no driving connection between crankarm heads 42 and 47.

After a dwell period has been experienced, which is equivalent to the length of time it takes the ratchet wheel to move a distance of four ratchet teeth in response to the driving of spring 92, a point will be reached where groove 73 (FIG. 3) bridges bores 75 and 95, the latter being vented to the atmosphere (FIG. 2). Thus when this occurs, chamber 84 will also be vented to the atmosphere through bore 95 in housing 55, groove 73, (which now bridges bores 95 and 75), bore 75, bore 76, bore 81, bore 82, and bore 83. Upon the venting of chamber 84 to the atmosphere, spring 38 will expand to drive head 42 of crankarm 21 into engagement with head 47 of crankarm 18 so that the keys 43 and 44 move into keyways 45 and 46, respectively, to thereby again establish the above described driving relationship which was described above relative to continuous wiper operation.

Chamber 84 remains vented from the time that bores 75 and 95 are bridged by groove 73 at the end of a clockwise ratchet stroke for the period of time that it takes spring 92 to oscillate in a counterclockwise direction to its limit of counterclockwise travel and thereafter again engage the succeeding tooth to thereby cause groove 73 to move in a clockwise direction to thereby terminate the above noted venting relationship, and until the initial portion 72′ (FIG. 3) of groove 72 again effects communication between bores 66 and 76 to again evacuate chamber 84 in the above described manner. In other words, wipers 29 and 32 will be caused to oscillate for one complete cycle of wiper movement during the length of time that it takes for ratchet wheel 68 to be moved through the peripheral distance of one tooth. Thereafter when chamber 84 is again evacuated, head 42 of crankarm 21 will move out of interlocking engagement with head 47 of crankarm 18, and the above described dwell cycle will be repeated until such time as groove 74 on ratchet wheel 68 again causes venting of chamber 84. The foregoing cycle of operation is continuously repeated with four ratchet strokes of dwell and one ratchet stroke of wiper movement to thereby provide the intermittent wiper operation which is desirable during light precipitation.

It will be noted at this point that it is impossible for ratchet wheel 68 to move in a counterclockwise direction in FIG. 3 inasmuch as a leaf spring 96 having one end thereof riveted to housing 55 to 97 acts as a pawl to prevent such counterclockwise movement during counterclockwise movement of shaft 30 on which crankarm 18 is mounted.

It will be appreciated that there are times when the vehicle is accelerated, as in passing another vehicle, and during this interval there is an increased deposit of precipitation on the windshield. It is obviously desirable to have the wipers operating continuously during the foregoing situation, and the instant intermittent linkage construction is inherently capable of providing this type of operation. More specifically, it will be appreciated that during acceleration of the vehicle, there is an accompanying drop in manifold vacuum. This being the case, the decrease in manifold vacuum is communicated to chamber 84 through the above described path, and because it is not as great as previously, spring 38 will expand to move crankarm head 42 into engagement with crankarm head 47, in the event that they are separated as they must be during a dwell period. Thus upon engagement of keys 43 and 44 with keyways 45 and 46, respectively, a driving relationship between crankarms 18 and 21 will be reestablished to thereby provide continuous movement of wipers 29 and 32 back and forth across the windshield. It will be appreciated that this engagement is effected in less time than it takes a single tooth to move through its entire peripheral movement, namely, one-tenth of 360° in this instance which would be 36°, which translated in terms of time, considering the speed of oscillation of lever 18, will be a fraction of one second. Thus the instant linkage is inherently capable of automatically providing continuous wiper motor operation when it is required during vehicle acceleration.

In the event it is desired to terminate either continuous or intermittent wiper operation, it is merely necessary to move knob 33 of control 34 to the left in FIG. 6 until such time as it returns to the position shown therein. In this case, conduit 63 leading to pivot shaft linkage 22, is vented through vent 100 with the attendant venting of chamber 84 of pivot shaft assembly 22 to thereby cause crankarm heads 42 and 47 to move into engagement, the linkage being synchronized so that such engagement is effected at the end of a wiper stroke. More specifically, it will be seen from FIGS. 4 and 5 that keys 43 and 44 can engage keyways 45 and 46, respectively, only when they are in alignment and thus in the event that knob 33 is manipulated when they are not in such an alignment, there will be a relative sliding movement between heads 42 and 47 until the keys lock in with the keyways.

It will thus be seen that the instant wiper linkage of the present invention is manifestly capable of achieving the above-enumerated objects in that a conventional wiper motor without being altered in any way whatsoever can be made to provide either continuous wiper operation or to cause the wipers to operate intermittently with intervening dwell periods between successive cycles of wiper movement. Furthermore, inherent in the linkage itself is the capability of switching from intermittent to continuous wiper operation in the event this is required under certain driving conditions, namely, when passing another vehicle or the like.

Certain specific embodiments of the invention have been described for the purpose of illustration, but it will be apparent that various modifications and other embodiments are possible within the scope of the invention. For example, in accordance with the broader aspects of the invention, any suitable type of motor such as pneumatic or hydraulic may be used in lieu of an electric motor and it may be of an oscillating type rather than a rotary type. Furthermore, other and different types of linkage means may be employed between the output of the power unit and the pivot assembly and the unique disengageable connecting means at the pivot assembly may be employed at other and different points in the linkage system. The linkage means is not, in accordance with the broader aspects of the invention, limited to a rigid link system, but a cable system may be employed or a combination of a cable and rigid link system can be utilized. It is further apparent that although a vacuum operated clutch is employed, with suitable modification the clutch may be actuated by a cam, a solenoid or other suitable controllable apparatus. It is to be understood, therefore, that the invention is not limited to the specific arrangement shown, but in its broadest aspect it includes all equivalent embodiments and modifications which come within the scope of the invention.

What is claimed is:

1. In motor vehicle windshield wiping apparatus for selectively producing continuous or intermittent dwell wiper operation having periods of rest between cycles of wiper operation, including a wiper, a power unit, transmission means for operatively connecting the output of said power unit to said wiper through a pivot shaft assembly for effecting oscillation of said wiper element; said pivot shaft assembly including a pivot shaft having a fixed longitudinal axis, a first clutch element mounted on said pivot shaft for rotation therewith, a second clutch element mounted on said pivot shaft for rotation relative thereto disposed adjacent said first clutch element, said first and second clutch elements having cooperating engaging means for effecting substantially conjoint rotation of said first and second clutch elements and one of said clutch elements being fluid operated for automatically effecting periodic engagement and disengagement of said first and second clutch elements.

2. In motor vehicle windshield wiping apparatus for selectively producing continuous or intermittent dwell wiper operation having periods of rest between cycles of wiper operation, including a wiper, a power unit, transmission means for operatively connecting the output of said power unit to said wiper through a pivot shaft assembly for effecting oscillation of said wiper element; said pivot shaft assembly including a pivot shaft having a fixed longitudinal axis, a first clutch element mounted on said pivot shaft for rotation therewith, a second clutch element mounted on said pivot shaft for rotation relative thereto disposed adjacent said first clutcht element, said first and second clutch elements having cooperating engaging means for effecting substantially conjoint rotation of said first and second clutch elements, one of said clutch elements being fluid operated for automatically effecting periodic engagement and disengagement of said first and second clutch elements and control means for selectively operatively connecting said fluid operated actuating means to a source of fluid pressure whereby either continuous or intermittent wiper operation may be selectively produced.

3. In motor vehicle windshield wiping apparatus for producing periods of rest between cycles of wiper operation, including a wiper, a power unit; transmission means for operatively connecting the output of said power unit to said wiper through a pivot shaft assembly for effecting oscillation of said wiper element, said pivot shaft assembly comprising a pivot shaft having a fixed longitudinal axis, a first clutch element mounted on said pivot shaft for rotation therewith, a second cluch element mounted on said pivot shaft for rotation relative thereto disposed adjacent said first clutch element, said first and second clutch elements having cooperating engaging means for effecting substantially conjoint rotation of said first and second clutch elements, fluid operated actuating means for automatically effecting periodic engagement and disengagement of said first and second clutch elements and valve means responsive to oscillation of said second clutch element for periodically effecting communication between said fluid operated actuating means and a source of fluid pressure.

4. In motor vehicle windshield wiping apparatus for producing periods of rest between cycles of wiper operation, including a wiper, a power unit, transmission means for operatively connecting the output of said power unit to said wiper element through a pivot shaft assembly for effecting oscillation of said wiper element; said pivot shaft assembly comprising a pivot shaft having a fixed longitudinal axis, a first clutch element mounted on said pivot shaft for rotation therewith, a second clutch element mounted on said pivot shaft for rotation relative thereto disposed adjacent said first clutch element, said first and second clutch elements having cooperating engaging means for effecting substantially conjoint rotation of said first and second clutch elements, one of said first and second clutch elements being axially movable into and out of engagement with the other of said first and second clutch elements, fluid operated motor means for moving said one clutch element axially, ratchet operated valve means for periodically connecting said fluid actuated motor to a source of fluid pressure, pawl means secured to and movable with said second clutch element for actuating said ratchet means to thereby effect periodic engagement and disengagement of said first and second clutch elements.

5. In motor vehicle windshield wiping apparatus for producing periods of rest between cycles of wiper operation, including a wiper, a power unit, transmission means for operatively connecting the output of said power unit to said wiper element through a pivot shaft assembly for effecting oscillation of said wiper element; said pivot shaft assembly comprising a pivot shaft having a fixed longitudinal axis, a first clutch element mounted on said pivot shaft for rotation therewith, a second clutch element mounted on said pivot shaft for rotation relative thereto disposed adjacent said first clutch element, said first and second clutch elements having cooperating engaging means for effecting substantially conjoint rotation of said first and second clutch elements, one of said first and second clutch elements being axially movable into and out of engagement with the other of said first and second clutch elements, fluid operated motor means for moving said one clutch element axially, ratchet operated valve means for periodically connecting said fluid actuated motor to a source of fluid pressure, pawl means secured to and movable with said second clutch element for actuating said ratchet means to thereby effect periodic engagement and disengagement of said first and second clutch elements and control means for effectively diverting said source of fluid pressure to selectively produce continuous wiper operation.

6. In motor vehicle windshield wiping apparatus for producing periods of rest between cycles of wiper operation, including a wiper, a power unit, transmission means for operatively connecting the output of said power unit to said wiper element through a pivot assembly for effecting oscillation of said wiper element; said pivot assembly comprising a pivot shaft having a fixed longitudinal axis, a first clutch element mounted on said pivot shaft for rotation therewith, a second clutch element mounted on said pivot shaft for rotation relative thereto disposed adjacent said first clutch element, said first and second clutch elements having cooperating engaging means for effecting substantially conjoint rotation of said first and second clutch elements when engaged, one of said first and second clutch elements being axially movable into and out of engagement with the other of said first and second clutch elements, fluid operated motor means for moving said one clutch element axially, ratchet operated valve means for effecting periodic communication between said fluid actuating motor and a source of fluid pressure, pawl means secured to and movable with said second clutch element for actuating said ratchet means to thereby effect periodic engagement and disengagement of said first and second clutch elements, and a source of fluid pressure variable in response to vehicle acceleration communicating through said valve means with said fluid motor.

7. Motor vehicle windshield wiping apparatus for producing periods of rest between cycles of wiper operation, including transmission means for driving a pivot shaft oscillatable on a fixed axis, controllably disengageable connecting means for connecting said transmission means to said pivot shaft, comprising a first clutch element mounted for rotation relative to said pivot shaft and having a first torque transmitting element secured thereto and a second clutch element disposed adjacent said first clutch element received on said pivot shaft and fixed for rotation therewith, a housing at said pivot shaft, a piston axially movable in said housing, one of said first and second clutch elements being secured to said piston for movement therewith and received on said pivot shaft for axial movement relative thereto, controllable biasing means for biasing said piston axially in one direction and resilient biasing means for returning said piston in the opposite direction when said controllable biasing means is deenergized, and timing means for controlling actuation of said controllable biasing means to effect periodic energization thereof, said timing means being responsive to oscillation of said first clutch element, means for continuously oscillating said first clutch element when said windshield wiping apparatus is in operating condition and control means for selectively effecting continuous or periodic engagement of said first and second clutch elements.

8. Motor vehicle windshield wiping apparatus for selectively producing continuous wiper operation or intermittent wiper operation having rest intervals between cycles of wiper operation, comprising a windshield wiping assembly, a linkage system for transmitting motion from a power unit to said windshield wiping assembly, said linkage system including a pivot shaft assembly having a pivot shaft mounted for oscillatory movement on a fixed axis, a housing disposed at said pivot shaft, a vacuum actuated piston axially reciprocable in said housing having a first clutch element fixed thereto for axial movement therewith received on said pivot shaft for axial movement relative thereto, a second clutch element received on said pivot shaft having a surface disposed in opposition to a surface of said first clutch element, cooperating engaging means on said opposing surfaces for effecting conjoint pivotal movement of said first and second clutch elements when engaged and permitting axial movement of said clutch elements relative to each other, said engaging means being disengageable when said clutch elements are moved axially in opposite directions relative to each other, one of said first and second clutch elements being rotatable relative to said pivot shaft, the other of said first and second clutch elements being fixed for rotation with said shaft, said one clutch element having a motion transmitting lever secured thereto for pivotal movement therewith, a ratchet operated rotary valve element disposed adjacent said one clutch element, a pawl actuated by said motion transmitting lever for operating said ratchet actuated valve in response to oscillatory movement of said motion transmitting lever, conduit means in said pivot shaft assembly communicating with said housing and adapted to the connected alternately to a vent and a source of vacuum through said ratchet actuated rotary valve and manual control means for selectively connecting said vacuum source to said housing through said valve and for venting said vacuum source.

References Cited by the Examiner
UNITED STATES PATENTS

| 1,542,400 | 6/25 | Ter Meer | 74—125.5 |
| 3,118,164 | 1/64 | Deibel et al. | 15—250.12 |

CHARLES A. WILLMUTH, *Primary Examiner.*